United States Patent [19]

Young et al.

[11] 4,351,984

[45] Sep. 28, 1982

[54] APPARATUS FOR USE IN A TELEPHONE EXCHANGE INCLUDING AN OPERATOR CORDBOARD POSITION

[75] Inventors: Robert E. Young, Clarendon Hills; Richard K. Huffman, Hoffman Estates, both of Ill.

[73] Assignee: Northern Telecom, Inc., Nashville, Tenn.

[21] Appl. No.: 172,236

[22] Filed: Jul. 25, 1980

[51] Int. Cl.³ ............................................. H04M 3/60
[52] U.S. Cl. .................. 179/7.1 R; 179/7 R; 179/27 FF
[58] Field of Search .............. 179/7 R, 7.1 R, 7.1 TP, 179/27 FE, 27 FH, 91 R, 94, 175.24

[56] References Cited

U.S. PATENT DOCUMENTS

| | | | |
|---|---|---|---|
| 3,777,058 | 12/1973 | Stidham et al. | 179/27 FF |
| 4,118,790 | 10/1978 | Cockett et al. | 179/7 R |
| 4,252,998 | 2/1981 | Astegiano et al. | 178/7 R |

FOREIGN PATENT DOCUMENTS 1281168  7/1972  United Kingdom .......... 179/27 FF

OTHER PUBLICATIONS

"KDX-O International Telephone Switching System" 1972 International Switching Symposium, 6-6-72, Nakazome et al.

"Mechanized Combined Line and Recording System" *GTE Automatic Electric Technical Journal* vol. 13 #5, Jan. 1973, Behnke et al.

*Primary Examiner*—Gerald L. Brigance
*Attorney, Agent, or Firm*—Birch, Stewart, Kolasch & Birch

[57] ABSTRACT

Apparatus is provided for eliminating manual completion of tickets by operators at operator positions, one or more of which are operator cordboard positions, of a telephone exchange. The apparatus comprises a keyboard and display unit and an independently operable processing and storage unit provided individually for each operator position, the operator position and keyboard and display unit being connected to the processing and storage unit. Each operator position functions with its associated units independently of the other operator positions and any central processing unit. All of the processing and storage units are coupled via a concentrator to automatic message accounting equipment for forwarding call records thereto for billing. The concentrator is connected to teletypewriters and also to a storage unit for storage of call records in the event of failure of the automatic message accounting equipment.

9 Claims, 4 Drawing Figures

APPARATUS FOR USE IN A TELEPHONE EXCHANGE INCLUDING AN OPERATOR CORDBOARD POSITION

This invention relates to apparatus for use in a telephone exchange having a plurality of operator positions, one or more of which are operator cordboard positions, and to a telephone exchange including such apparatus.

Many toll telephone calls are made without the assistance of an operator, using the direct distance dialling (DDD) system. The DDD system, in conjunction with automatic message accounting (AMA) equipment, routes the call, records the called subscriber number, obtains the calling subscriber number from automatic number identification (ANI) equipment, times the call, and records details of the call on magnetic tape for subsequent billing of the calling subscriber.

However, there are many situations where operator assistance is necessary. Examples of such situations are: when the calling subscriber's exchange has no ANI equipment, in which case an operator must intervene to request the calling subscriber's number, this being referred to as operator number identification (ONI); for person-to-person and collect calls; calls, e.g. from hotel rooms, for which time and charge (T&C) information is required; and calls from coin telephones. Operator assistance is also required for calls to be billed to a credit card or third party number, and in these instances the operator must generally enter this additional number, together with related call information, onto a computer mark-sense card, commonly called a ticket, because the automatic ticketing equipment is not generally able to receive the additional number. The ticket manually completed by the operator must subsequently be correlated with the automatically ticketed information for proper billing. Furthermore, large numbers of toll calls are still established using operator cordboard positions which have no provision for automatic ticketing. For such calls, the operator must, in addition to establishing the connection via the cordboard, manually enter all of the necessary billing information onto a mark-sense card or ticket.

The completion of tickets by operators is a time consuming task which is subject to errors, resulting in inefficiency and lost billings. Furthermore, equipment required for reading the manually completed tickets takes up valuable space and requires maintenance, resulting in further costs. Accordingly, it is desirable to eliminate the need for manual completion of tickets by operators.

The so-called traffic service position system and traffic operator position system have been introduced to increase operator efficiency and eliminate manual ticket completion in stored-program control (SPC) computer-controlled switching systems. Whilst such systems are well suited to the requirements of very large switching centers such as in cities, they are far too expensive to be used in the very many smaller telephone exchanges which exist. Furthermore, they cannot be used as an adjunct to existing operator positions in such smaller telephone exchanges, but rather provide their own operator positions to completely replace existing equipment.

An object of this invention, therefore, is to provide apparatus, for use in a telephone exchange having a plurality of operator positions one or more of which are operator cordboard positions, which substantially eliminates the need for manual completion of tickets by operators.

According to one aspect of this invention there is provided such apparatus comprising a plurality of information entry and display means each associated with a respective operator position, each information entry and display means comprising means for entering and displaying information relating to telephone connections which are established using the respective operator position; a plurality of independently operable processing and storage means each coupled to an individual respective one of said information entry and display means; means for coupling each processing and storage means to the operator position which is associated with the information entry and display means which is coupled to the respective processing and storage means; each processing and storage means being arranged for monitoring the operator position to which it is coupled, checking information entered via the information entry and display means to which it is coupled, controlling the display of information by the information entry and display means to which it is coupled, timing connections established using the operator position to which it is coupled, and storing information relating to said connections; and means for coupling said processing and storage means to automatic message accounting equipment for transferring thereto stored information from each processing and storage means.

Thus each processing and storage means has only one operator position and the associated information entry and display means coupled to it.

An important feature of the invention is the independent operability of each processing and storage means. This feature provides the advantage that each operator position can function entirely independently of the other operator positions and without dependence upon any common central processing unit. If the operator positions' functioning were dependent on a common central processing unit, this would have to be duplicated and provided with error detection and correction facilities in order to provide the necessary continuous operator service, rendering the apparatus very complex and expensive and therefore unsuitable for small telephone exchanges. In contrast to this, the distributed and independent processing and storage provided in accordance with the invention enables each operator position to function independently. In consequence, each of the individual processing and storage means does not need to be duplicated. The occurrence of a fault in one of the individual processing and storage means can be tolerated because it only affects the operator position connected to it, and does not result in disruption of the entire operator service.

Each information entry and display means preferably comprises a keyboard and display unit having a plurality of keys for information entry, a plurality of lights at least some of which are associated with at least some of the keys, and a numeric display. In the embodiment described hereinafter, the association of lights with keys is effected in that lights are incorporated within the keys themselves.

Preferably, each processing and storage means and the means for coupling it to the respective operator position comprise a microprocessor and storage unit and interface circuits for connection to the respective operator position and information entry and display means.

The means for coupling the processing and storage means to automatic message accounting equipment preferably comprises a processing and storage unit for temporarily storing and concentrating the information relating to said connections established using the operator positions and for transferring the concentrated information to the automatic message accounting equipment. The processing and storage unit is preferably duplicated and provided with error detection means for comparing signals in the duplicated units to detect errors.

Thus in the event of failure of the automatic message accounting equipment, this coupling means provides for temporary information storage. In order to supplement such storage, the apparatus preferably includes a further storage unit, such as a floppy disc store, coupled to the coupling means. The apparatus preferably further includes at least one teletypewriter coupled to the coupling means, for printing information from and entering information into the coupling means.

Preferably each processing and storage means includes means for forwarding the stored information relating to a connection, to the means for coupling the processing and storage means to automatic message accounting equipment, in response to termination of the connection, and in the event that the stored information can not be forwarded for providing an indication of this via the respective information entry and display means. Thus in the event that, despite the duplication of processing and storage units in the coupling means to the automatic message accounting equipment, due to a fault in the coupling means information stored in a processing and storage means can not be forwarded, this is indicated to the operator at the respective operator position, who can memo and then cancel the stored information and continue operating. The memoed information can be subsequently re-entered via the information entry and display means and forwarded to the coupling means when the fault has been cleared.

The invention also extends to a telephone exchange including apparatus as recited above.

The invention will be further understood from the following description with reference to the accompanying drawings, in which.

Figure 1:
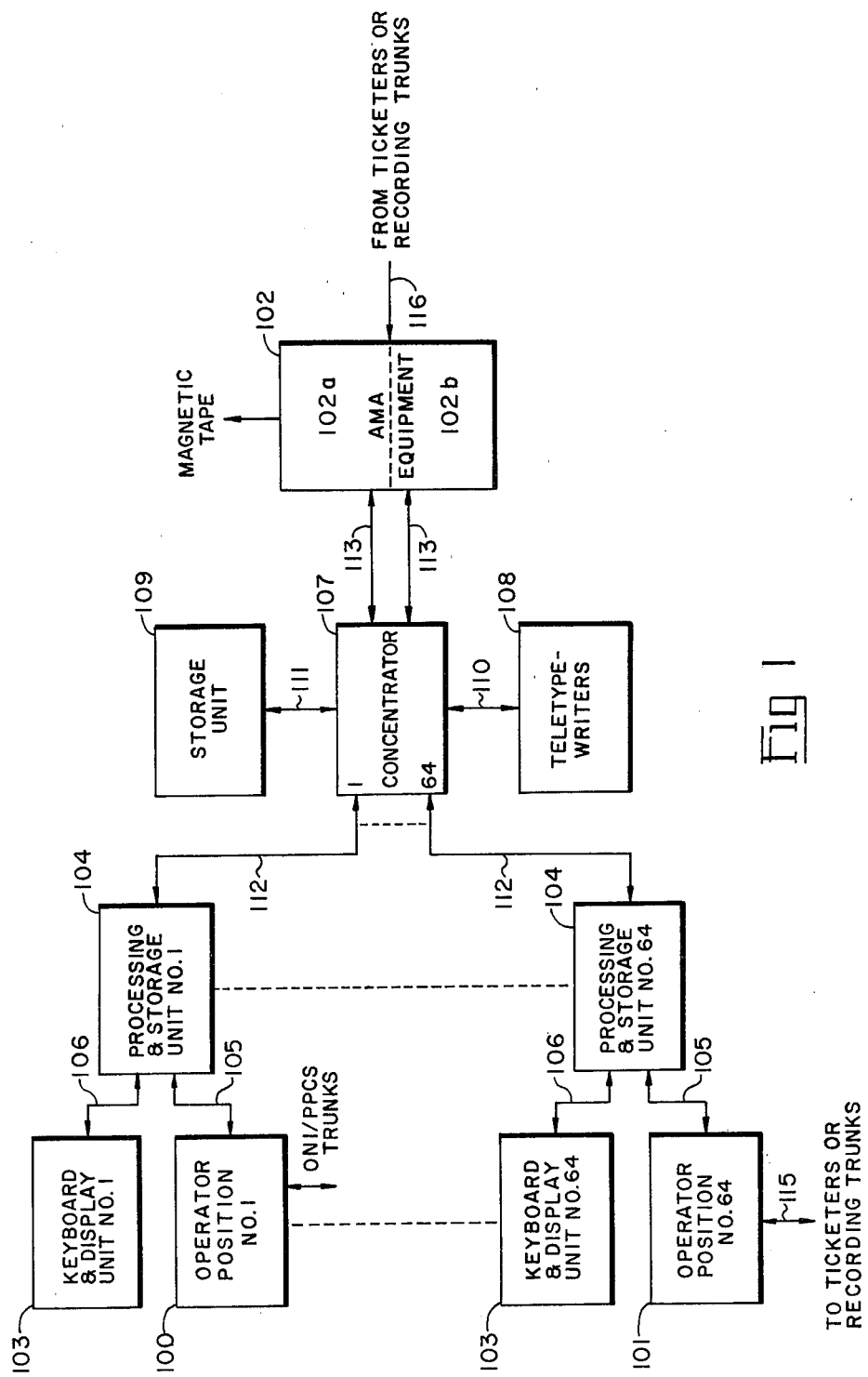
FIG. 1 illustrates in a block diagram apparatus, according to a preferred embodiment of the invention, connected to operator positions and automatic message accounting (AMA) equipment.

The apparatus illustrated in FIG. 1 serves to couple up to 64 operator positions, only two of which are shown and referenced 100 and 101, to an AMA equipment 102. The apparatus comprises a plurality of keyboard and display units 103, one associated with each operator position, each of which constitutes an information entry and display means for the respective operator, and a like plurality of process and storage units 104, one associated with each operaor position, to each of which the respective operator position 100, 101 and keyboard and display unit 103 are coupled via lines 105, 106 respectively. Each of the processing and storage units 104 is operable independently of the other units 104 and independently of the concentrator 107 described below and the AMA equipment 102.

The apparatus further comprises the concentrator 107, and teletypewriters 108 and a storage unit 109 which are coupled to the concentrator 107 via lines 110, 111 respectively. The processing and storage units 104 are individually coupled to the concentrator 107 via lines 112. The concentrator 107 is directly coupled to the AMA equipment 102 via duplicated lines 113; the concentrator 107 could alternatively be coupled to the AMA equipment 102 via a modem (modulator-demodulator), especially if the AMA equipment 102 is located remotely from the concentrator 107. As is known, the AMA equipment 102 consists of duplicated processors 102a and 102b, which serve to store accounting information on magnetic tape for later processing and billing.

Each of the operator positions 100, 101 can be any of a wide variety of known types of operator position. It is assumed here, for example, that the first operator position 100 is an operator cordboard position, which is connected via lines 114 to CLR trunks for operator number identification, person-to-person, collect, and special services. Hitherto, an operator at such a position has had to manually complete mark-sense cards for billing purposes. It is also assumed here that the 64th operator position is an Automatic Electric (AE) EDDD position which is connected via lines 115 to automatic electro-mechanical ticketers or electronic recording trunks (not shown). The automatic ticketers or recording trunks normally handle telephone calls automatically without operator assistance, forwarding billing information directly to the AMA equipment 102 via lines 116. When operator assistance is required, such as for person-to-person, collect, and special calls, the calls are switched via the automatic equipment to the operator position 101 to be handled by the operator there. Hitherto, an operator at such a position has had to complete mark-sense cards for calls to be billed to a credit card or third party number because the automatic equipment can not handle the additional number required for billing such calls. Other operator positions (not shown) can be the same as these two types of position, or combined cordboard/PPCS positions, or other types of manual or partly-automated operator positions.

Figure 2:
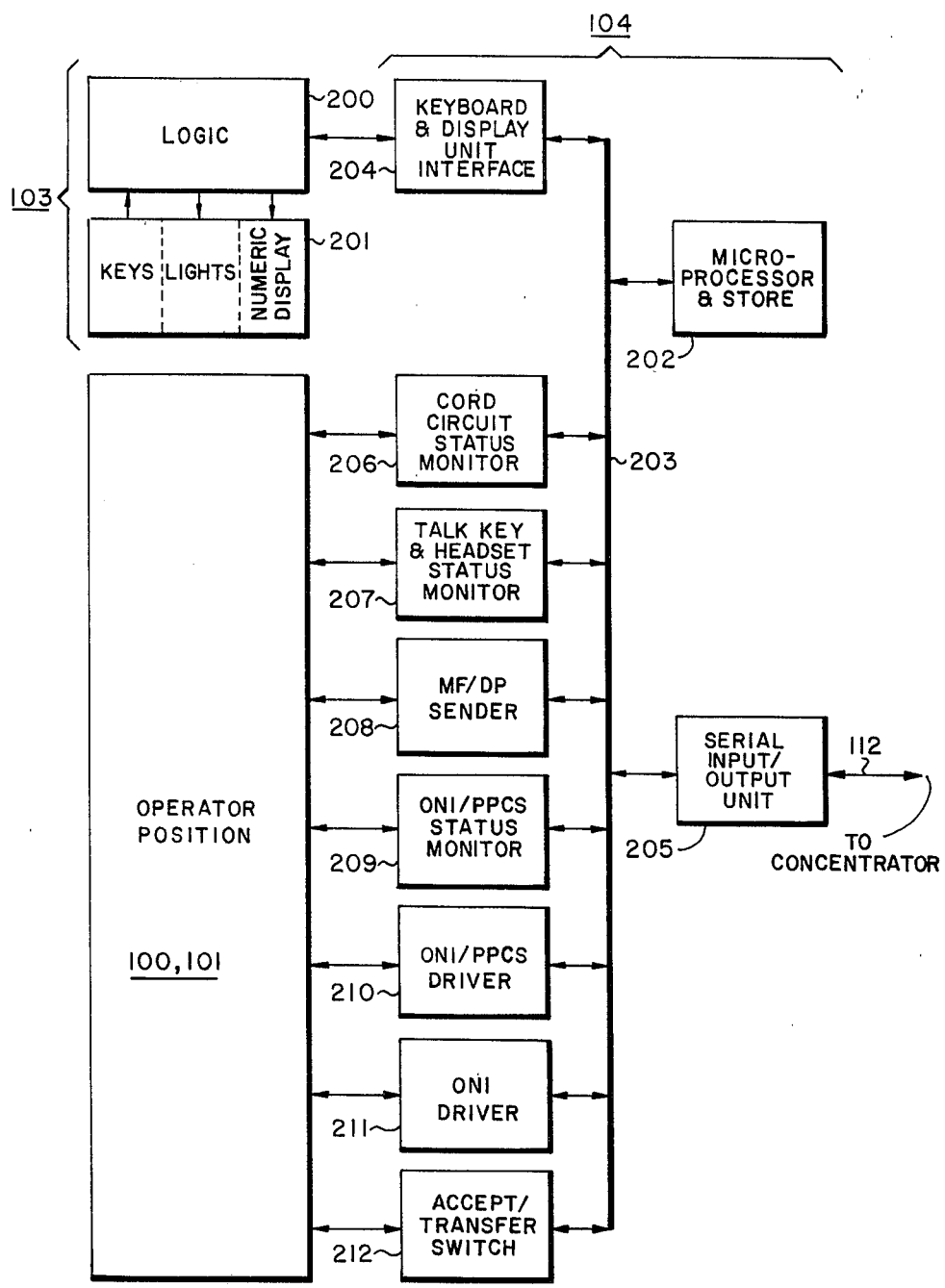
FIG. 2 illustrates in a block diagram an operator position, and a keyboard and display unit and processing and storage unit of the apparatus of FIG. 1.

FIG. 2 illustrates in more detail the form of a keyboard and display unit 103 and a processing and storage unit 104. The keyboard and display unit 103 consists of a logic section 200 and a keyboard and display 201 comprising keys, lights, and a numeric display. The processing and storage unit 104 consists of a microprocessor and store 202, a data bus 203, a keyboard and display unit interface circuit 204, a serial input/output unit 205, and a plurality of interface circuits 206 through 212 connected between the data bus 203 and the lines 105 connected to the respective operator position 100, 101. Depending on the nature of the particular operator position 100, 101, not all of the circuits 206 through 212 may be required and accordingly some of these may be omitted from particular ones of the processing and storage units 104.

The logic unit 200 serves to couple the keyboard and display 201, which is described below with reference to FIG. 4, to the processing and storage unit 104. In the unit 104 the microprocessor and store 202 serves to validate keying operations on the keyboard and display 201, store information for each call for the duration of the connection, and control the sending of information (the call record) to the concentrator 107 upon termination of each connection, this information being sent via the data bus 203, the serial input/output unit 205, and the lines 112.

The keyboard and display unit interface circuit 204 is controlled by the microprocessor and store 202 to transmit information from the microprocessor to the Logic Unit 200. The logic unit 200, scans the keys of the keyboard to monitor key operations, and transmits data relating to key operations to the microprocessor via the circuit 204 thereby relieving the microprocessor of the key scan task. The microprocessor and store 202 writes data into the circuit 200 via the circuit 204 four times per second to control the lights and numeric display of the keyboard and display 201.

The interface circuits 206 through 212 include a cord circuit status monitor 206 which continuously monitors the states of the rear sleeve (RS) and front sleeve (FS) cords of any cordboard forming part of the operator position. Similarly, a talk key and headset status monitor 207 continuously monitors the states of the talk keys of the operator position and also detects the connection of a headset to the operator position to determine when an operator is at the position.

An MF/DP sender 208 is optionally provided for forwarding digits of a called number using either multi-frequency (MF) or dial pulse (DP) signalling. The sender 208 monitors current flow in an outgoing circuit via which the called number is to be forwarded, and adopts DP or MF signalling depending on whether or not, respectively, a current flow is detected.

An ONI/PPCS status monitor 209 is optionally provided to detect operator functions for ONI/PPCS operations. In addition it causes the ONI ACC or PPCS ACC lights of the keyboard and display 201, described below, to flash to indicate waiting calls which require assistance. An ONI/PPCS driver 210 and an ONI driver 211 are optionally provided to send information, such as class marks and called or calling numbers in WXYZ code, relating to PPCS and ONI calls via the operator position to the telephone toll network. An accept/transfer switch 212 enables the operator position to accept PPCS, CKO and ONI overlap calls, and comprises relays which respond to the appropriate keys of the keyboard to duplicate the functions of OL/PS and CK/AC keys at the operator position.

The microprocessor and store 202, which controls all of the various other circuits of the unit 104, consists of a microprocessor, a data memory, and a program memory which are not separately shown. The program memory stores instructions for the microprocessor to perform all the required logic operations, and call record data is stored in the data memory for the duration of each connection. In the present embodiment, the data memory is addressed in dependence upon which one of up to ten talk keys at the operator position is open, so that up to ten call records can be stored. The termination of each call is monitored by the microprocessor, and upon termination this is indicated to the operator via the keyboard and display 201 and the complete call record is sent via the serial input/output unit 205 to the concentrator. The microprocessor and store 202 can also communicate with the concentrator via the unit 205 for obtaining other information such as time-of-day updates, credit card validations, extended area service (EAS) blocking codes, and special emergency numbers. However, such communication is not essential to operation of the units 103 and 104 and the respective operator position, so that each operator position can continue to function even in the event of a breakdown of the concentrator 107 on lines 112. Furthermore, duplication of the microprocessor and store 202 and other parts of the unit 104 is not necessary because a breakdown here affects only the one operator position.

Figure 3:
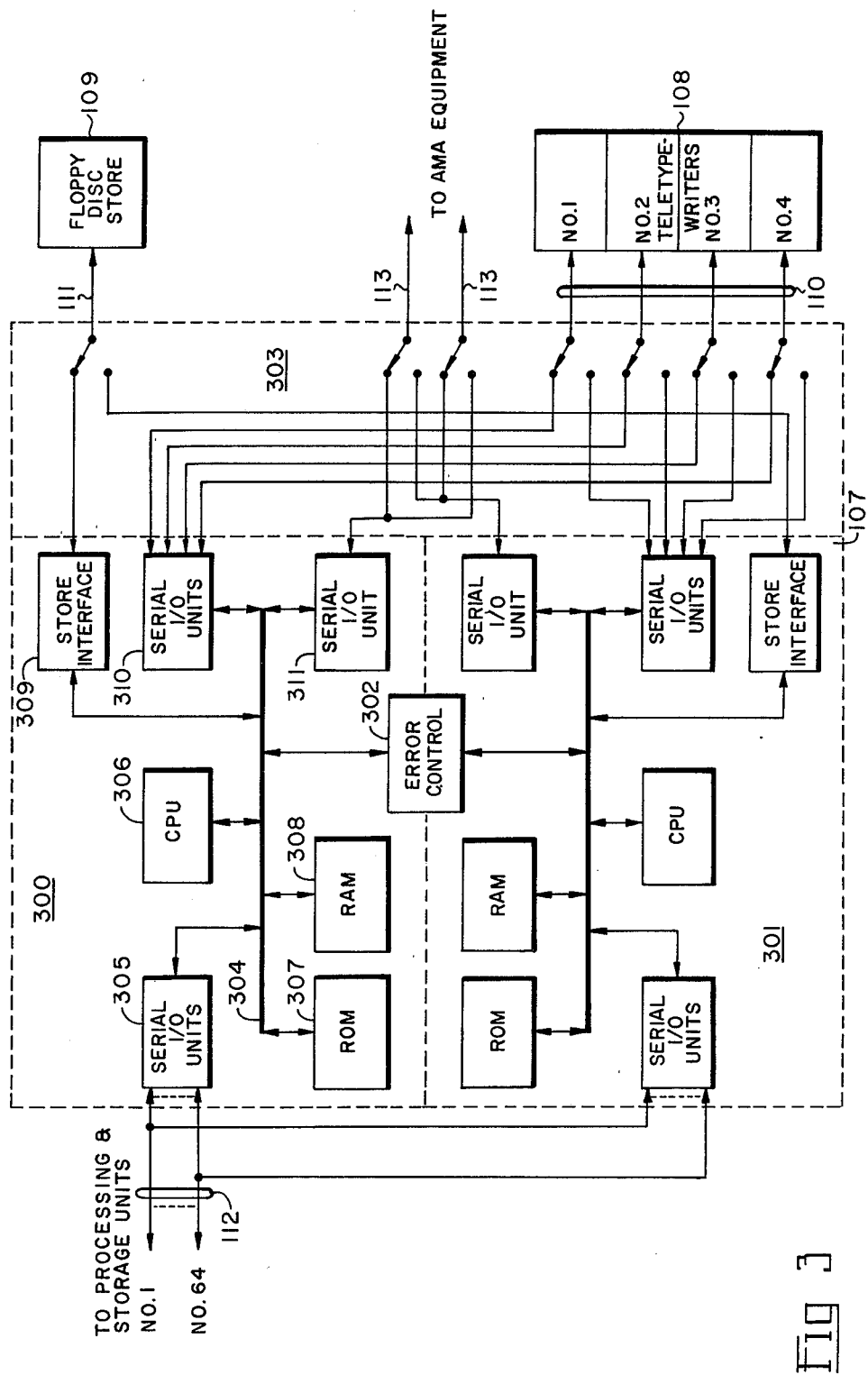
FIG. 3 illustrates in a block diagram a concentrator and peripheral equipment forming part of the apparatus of FIG. 1.

FIG. 3 illustrates in more detail the concentrator 107 and its connections to the teletypewriters 108 and storage unit 109, which is a floppy disc store. The concentrator 107 consists of two identical units 300, 301, an error control unit 302, and a switching arrangement 303. The unit 300 comprises a data bus 304; 64 serial input/output units 305 each of which couples a respective one of the lines 112 to the data bus 304; a central processing unit (CPU) 306, a program store constituted by a read-only memory (ROM) 307, which may be an erasable programmable read-only memory which is not affected by power failure, and a data store constituted by a random-access memory (RAM) 308, each coupled to the data bus 304; and a floppy disc store interface circuit 309, four serial input/output units 310, and a serial input/out unit 311, each coupled to the data bus 304 and selectively couplable respectively to the store 109 via the lines 111, the teletypewriters 108 via the lines 110, and the AMA equipment 102 via the lines 113, via respective switches in the switching arrangement 303. The unit 301, being identical to the unit 300, is not further described here.

The error control unit 302 is coupled to the data bus 304 in each of units 300 and 301 to compare signals in the two units and, in the event of a fault occurring in one of the units 300, 301, to control the switches in the switching arrangement 303 to effect any necessary switch-over to the other, correctly operating unit 300 or 301. Whilst the switches of the arrangement 303 are shown as mechanical switches for convenience, in fact they are electronic switches which are controlled by the error control unit 302, or manually, by means not shown but well known in the art. As can be clearly seen from the drawing, the switches of the arrangement 303 serve to couple the lines 110, 111, and 113 to the respective interface units 309, 310, and 311 of selectively the unit 300 or the unit 301.

As shown in FIG. 3, there are four teletypewriters 108 corresponding to the four serial input/output units 310, comprising a trouble/maintenance teletypewriter (#1), a report teletypewriter (#2) for printing statistics relating to the operator positions, and two teleprinters (#3 and #4) for time and charge reports. A different number or arrangement of teletypewriters may be provided, there always being at least the trouble/maintenance teletypewriter present.

Under the control of the program store 307, the CPU 306 controls the units 305 to receive call record data from each of the lines 112, i.e. from each operator position, at 305 baud, this data being multiplexed and stored in the RAM 308. The call record data is then processed, compacted, and transmitted at 1200 baud from the RAM 308 via the unit 311 and lines 113, or via a modem as already described, to the AMA equipment 102. In addition, the CPU 306 serves periodically to check and accurately update the timing of each of the processing and storage units 104, and in conjunction with the RAM 308 serves to provide credit card validations, EAS blocking codes, and emergency numbers as already referred to. The data required in the latter respects is initially entered via the floppy disc store 109, from which it is stored in the RAM 308 shortly after start-up of the system. The data is retained in the store 109 to be recalled in the event of a power failure. The CPU 306 also controls the storage in the RAM 308, and processing and transfer to the store 109 or one of the teletypewriters 108, of statistics relating to the operator positions.

Each message between one of the serial input/output units 305 and the unit 205 to which it is coupled comprises a coded header byte defining the type (e.g. call record data, credit card number, etc.) and length of the message, the message bytes, and a final single byte checksum. Each message between the serial input/output unit 311 of one of the units 300, 301 and the AMA equipment 102 comprises a type byte which identifies the length of the message, a byte identifying to which one of the units 300, 301 the message relates, a plurality of message bytes, and two final check bytes. Each byte consists of a start bit, 8 data bits, and a stop bit. In the event that the AMA the equipment 102 does not acknowledge a message transmitted from the concentrator, possibly after retransmission of the entire message, an error is indicated the AMA equipment 102 and by the trouble teletypewriter 308 at the concentrator. When the RAM 308 is filled with call records in these circumstances, further call records are stored by the CPU 306 in the floppy disc store 109 via the store interface 309, to be recalled and transmitted to the AMA equipment 102 when the error has been corrected. Thus the concentrator 107 is able to operate to store call records independently of the operation the AMA equipment 102.

As will be appreciated from the above description, each of the serial input/output units 205, 305, 310, and 311 serves to convert between serial data on the respective lines 112, 110, or 113 and parallel data on the respective data bus 203 or 304. The store interface 309 in each of the units 300, 301 is a parallel data interface, data being transferred between the data bus 304 and the store 109 via an 8-bit data bus constituted by the lines 111.

Figure 4:
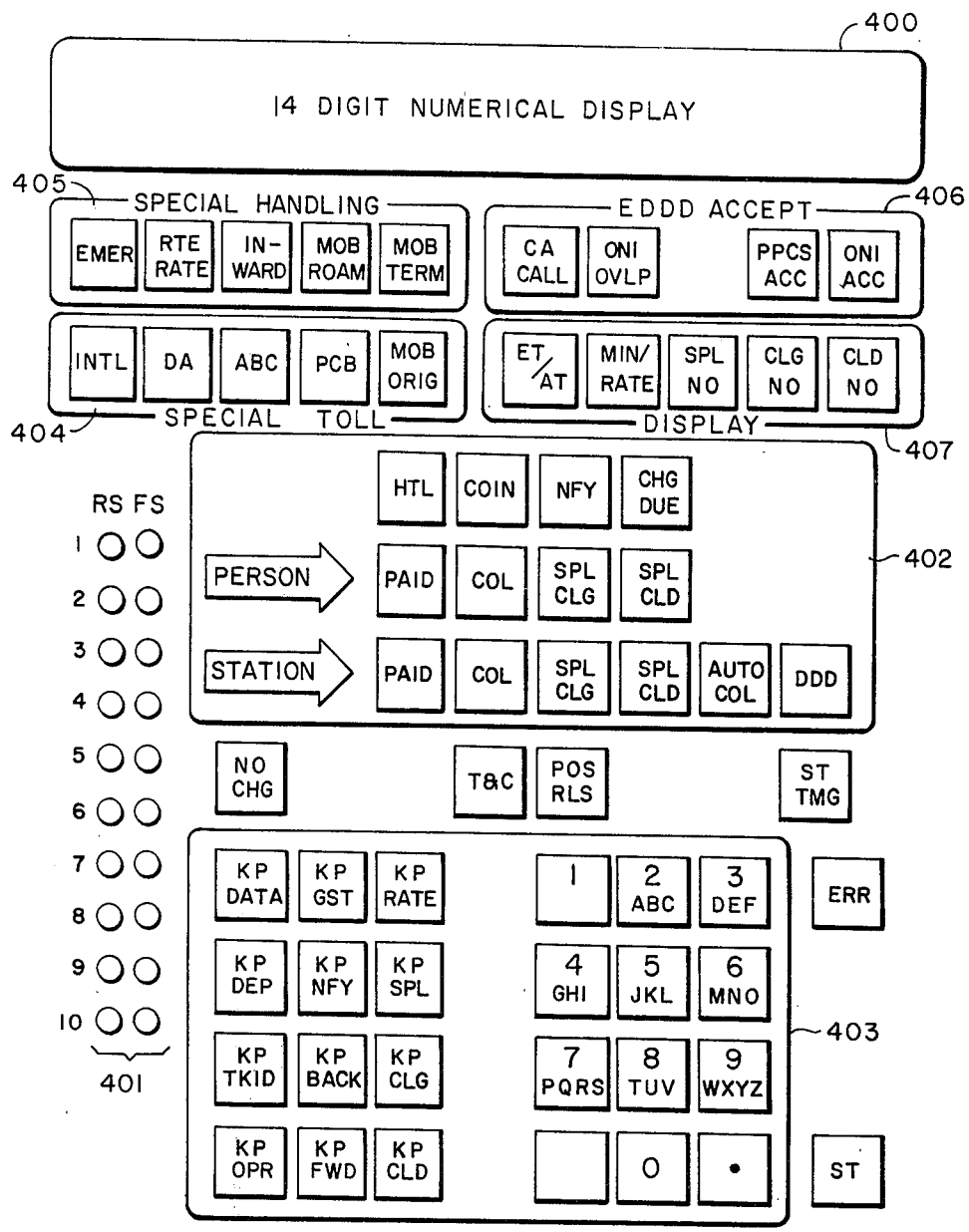
FIG. 4 shows the layout of the keyboard and display unit of FIG. 2.

FIG. 4 illustrates the form of the keyboard and display 201. As already described, this consists of a numerical display, lights, and keys. The numerical display is a 14 digit numerical display 400 positioned above the keys, which are labeled in FIG. 4 and are described below. The lights consist of a light, not separately shown, in each key except the numeric keys, and 20 lights 401 which are associated respectively with the rear (RS) and front (FS) cords of ten cord circuits 1 to 10 of the operator position. Each light may be on, off, or flashing.

The keys consist of class keys 402, keypad keys 403, special toll keys 404, special handling keys 405, extended direct distance dialling (EDDD) accept keys 406, display keys 407, and miscellaneous keys labeled NO CHG, T&C, POS REL, ST TMG, ERR, and ST. The functions of the keys are as follows:

The class keys 402 are used to mark the class of a call, and their lights are turned on when the respective keys are pressed, and are flashed to indicate that additional data must be entered into the call record for the class of call marked. One of the keys in the lower row, marked "STATION," is pressed for station-to-station calls, and one of the keys in the middle row, marked "PERSON," is pressed for person-to-person calls. The respective key pressed to make the call class is the PAID key for calls charged to the calling number, the COL key for collect calls charged to the called number, and the SPL CLG or SPL CLD key for calls charged to a credit card or third party number supplied by respectively the calling or called party. Pressing the latter keys causes the light of the KP SPL key described below to flash for entry of the additional number. For station-to-station calls, the AUTO COL key is pressed for calls charged to an automatic collect number (ENterprise or INWATS), and the DDD key is pressed for calls to be charged at direct distance dialling (DDD) rates although operator assistance has been required.

The upper row of class keys 402 are used in conjunction with the other class keys. The key HTL is pressed with one of the PAID keys for a call originating from a hotel guest room; the call is automatically marked T&C to produce a time and charge print out on one of the teletypewriters 108, and the KP GST key described below is flashed for entry of the room number. The COIN key is pressed with one of the PAID keys for a call originating from a coin-box telephone; the call is automatically marked NFY and the KP DEP key described below is flashed for entry of the deposited amount. On such calls, the NFY key light is flashed after an initial set time period to remind the operator to notify overtime status of the call. For other calls, the NFY key light can be flashed after a variable time period set by pressing the KP NFY key described below followed by a two-digit number representing this time period. The flashing NFY key lamp is turned off by pressing the NFY key after notification. The CHG DUE key is flashed when the coin-box customer of an overtime PAID COIN call disconnects, alerting the operator that further charges are due, and is turned off when the KP DEP key is pressed followed by an entry of the amount of the deposit.

The keypad keys 403 comprise the numeric keys 0 through 9 and . and 12 keys prefixed KP which prepare the system to receive a digit sequence from the numeric keys. The numeric key . is used to terminate a digit sequence which is shorter than a predetermined number of digits for the particular KP key pressed, and to mark the decimal point in money amounts deposited. Except for the KP OPR key, the KP keys can be flashed automatically as described above, or upon pressing a key manually, to allow entry of digits whereupon the relevant KP key remains on. The entered digits are displayed, for 5 seconds or until another KP key is pressed, on the display 400, and can be recalled by pressing a lit KP key.

The KP OPR key is pressed, followed by a 4-digit operator number, when an operator initially occupies the operator position, in order to identify the operator to the system and to enable the system to respond to subsequent key entries. On pressing the KP OPR key its light is turned on, and it remains on until the operator leaves the position at which time the operator presses first the KP OPR key and then the ERR key described below. The KP CLD, KP CLG, KP SPL, and KP GST keys are pressed preceding entry via the numeric keys of a 7 or 10 digit called number, a 7 or 10 digit calling number, a credit card or third party number, and a 4 digit hotel room number, respectively. The KP DEP key is pressed preceding entry of a deposited amount for a COIN PAID call. The KP RATE key is pressed preceding entry of a rate step which can be used optionally to assist the operator in calculating overtime charges on COIN PAID calls. As already described, the KP NFY key is pressed preceding entry of a 2 digit time in minutes after which a customer has requested notification. KP BACK key is pressed to send back on the rear sleeve cord either the calling number or digits entered by the operator, and the KP FWD key is pressed to forward on the front sleeve digits a number, other than the called number, entered by the operator. The KP TKID key is pressed preceding entry of a 3-digit ticketer identity number required when entering hotel room or special billing number calls handled in the PPCS ACC (person-to-person, collect, special accept) mode of operation, such as occurs for the operator position #64 described above. The KP DATA key is pressed preceding entry of a trouble code required in various circumstances, for example to provide credit to a call.

The special toll keys 404 comprise keys labeled INTL, DA, ABC, PCB, and MOB ORIG. The INTL key is pressed for international calls requiring a 12 digit called number and the operator to supply using the KP FWD key a 6 digit access code to the gateway office. The DA key is pressed for directory assistance calls, and the ABC key is pressed for entry of a 14 digit personal identification number in an automatic bill calling system which is yet to be implemented in telephone networks. The PCB key is pressed for person call-back calls, in which the call originator asks the operator to request the call terminator to call back a specific operator; this key reverses the called and calling number storage to provide proper billing information on the call record. The MOB ORIG key is pressed for calls originating from a mobile subscriber; for such calls, the 3-digit local office code is entered using the KP CLG key, and unless the call is a collect call the mobile subscriber's number, third party number, or credit number is entered using the KP SPL key.

The special handling keys 405 comprise keys labeled EMER, RTE RATE, INWARD, MOB ROAM, and MOB TERM. For an emergency call, the EMER key is pressed and then an emergency directory number or a single digit is entered via the numeric keys. In the latter case one of the special emergency numbers stored in the concentrator is accessed. Pressing the RTE RATE key followed by a single digit on the numeric keys provides access selectively to a coin rate computer, route operator, or network trouble computer. The INWARD key is pressed to terminate a call without a class mark in the case of an inward call received from another operator. The MOB ROAM key is pressed in conjunction with the MOB TERM or MOB ORIG key to indicate a mobile subscriber located out of his home area. The MOB TERM key is pressed for a call terminating to a mobile subscriber.

Among the EDDD accept keys 406, the PPCS ACC and ONI ACC keys are pressed to accept respectively PPCS and ONI calls which are indicated by the lights of these keys being flashed. The ONI OVLP key is pressed to handle a waiting ONI call during handling of a PPCS call. The CA CALL key is pressed to cancel PPCS and ONI calls and to cancel data entered for a call.

One of the display keys 407 is pressed to display data on the display 400 for 5 seconds or until another display key or a KP key is pressed. The ET/AT key causes display of a 5 digit number representing elapsed time of a call and a 6 digit number representing the answer time of an answered call or the current time if the call has not been answered. The MIN/RATE key causes display of a 3 digit number representing overtime minutes on a COIN PAID call, and an overtime rate step if previously entered by the operator. The SPL NO, CLG NO, and CLD NO keys cause display of numbers previously entered using the KP SPL, KP CLG, and KP CLD keys respectively.

Of the miscellaneous keys, the NO CHG key is pressed to identify a no-charge call, and the T&C key is pressed to produce a time and charge print out of the call record on one of the teletypewriters 108. The POS RLS key is pressed to release the keyboard from a PPCS call and forward the call record to the concentrator 107. The ST key is pressed after making the required class of call and KP entries to send a call forward to the called number. The ST key light is turned on when the key is pressed and off when the call data has been sent. The ST TMG key is pressed to start call timing when this must be done manually, e.g. on collect and special number calls; generally call timing is started automatically when a called party answers. The ERR key is used to correct errors. Invalid key sequences are detected by the processing and storage unit 104 which causes the lights of the ERR key and any invalidly pressed keys to flash; pressing the ERR key clears the error and the lights are turned off. To clear a key function and associated data, the ERR key and then the relevant function (e.g. KP) key are pressed.

The 20 lights 401 consist of 10 pairs of lights RS and FS corresponding to rear and front cords respectively of 10 cord circuits of the operator position. Each light indicates the hook status of the associated subscriber instruments; for example each RS light is off if the calling subscriber's telephone connected to the relevant cord circuit of the operator position off hook, and is on if the telephone is on hook. The FS light is flashed at the completion of a call to indicate that the operator must perform a further function before the call record can be released, the call record normally forwarded to the concentrator 107 when the call is terminated. If due to fault for example in the concentrator 107, the call record can not be forwarded to the concentrator, this is indicated to the operator by the RS and FS lights being flashed alternately, under the control of the unit 104, when the cords are pulled at the completion of a call. In this case the operator memos the call record for later re-entry and forwarding to the concentrator, and presses the CA CALL key to clear the call record. On an emergency call, the RS light is flashed throughout the call as a reminder to the operator.

The following tables illustrate specific call handling procedures in detail by way of example of the operation and use of the keyboard and display. The procedures for handling numerous other types of calls will be clear from these examples and the above description of the key functions.

TABLE 1

Person-to-Person Special Called Call (initiated as a collect call)
Associated RS light is off because calling party is off-hook

| Step | Operator Action | Comments |
|---|---|---|
| 1. | Connect rear cord, open talk key, request call class, calling and called numbers. | Cordboard lights. calling party is off-hook. |
| 2. | Press KP CLG key and enter calling number using numeric keys. | KP CLG key light flashes and then stays on when calling number is accepted. |
| 3. | Press KP CLD key and enter called number using numeric keys. | KP CLD key light flashes and then stays on when called number is accepted. |
| 4. | Press PERSON COL key. | PERSON COL key |

TABLE 1-continued

Person-to-Person Special Called Call (initiated as a collect call)
Associated RS light is off because calling party is off-hook

| Step | Operator Action | Comments |
|---|---|---|
| 5. | Connect front cord. | light turns on. Associated FS light turns on. |
| 6. | Press ST key. | ST key light flashes, called number is sent forward, then ST key light turns off. |
| 7. | Reach called party, who request that the call be billed to a special number (third party or credit card number). | Associated FS light turns off. ST TMG key light flashes. |
| 8. | Press ERR key and then PERSON SPL CLD key to change call class. | ERR key light flashes, then ERR and PERSON COL key lights turn off and PERSON SPL CLD key light turns on. |
| 9. | Press KP SPL keys and enter | KP SPL key light flashes |

TABLE 1-continued

Person-to-Person Special Called Call (initiated as a collect call)
Associated RS light is off because calling party is off-hook

| Step | Operator Action | Comments |
|---|---|---|
|  | special number using numeric keys. | and then stays on when special number is accepted. |
| 10. | Press ST TMG key. | ST TMG key light turns on, indicating start of call timing. |
| 11. | Close talk key. | All lights associated with call turn off. Another call can be serviced. |
| 12. |  | When calling and called parties go on-hook at end of call, associated RS and FS lights turn on. |
| 13. | Pull rear and front cords. | Call record is sent to concentrator and call is cleared from keyboard and display. RS and FS lights turn off. |

TABLE 2

Coin Station-to-Station Paid Call

| Step | Operator Action | Comments |
|---|---|---|
|  |  | Cordboard lights, indicating coin-call. |
| 1-3. | As steps 1-3 in Table 1. | See steps 1-3 in Table 1. |
| 4. | Press COIN and STATION PAID keys. | COIN AND STATION PAID key lights turn on. |
| 5,6. | As steps 5,6 in Table 1. | See steps 5,6 in Table 1. |
| 7. |  | At answer supervision (called party off-hook), associated FS light turns off, KP DEP key light flashes. |
| 8. | Request deposit required. After deposit is made, enter amount of deposit using numeric keys. | EP DEP key light stays on. ST TMG key light turns on, indicating start of call timing. |
| 9.* | Press KP RATE key and enter overtime rate using numeric keys. | KP RATE key light flashes and then stays on. |
| 10. | Close talk key. | All lights associated with call turn off. Another call can be serviced. |
| *For a call under 3 minutes:* |  |  |
| 11,12. | As steps 12, 13 in Table 1. | See steps 12, 13 in Table 1. |
| *For a call over 3 minutes:* |  |  |
| 11. |  | RS light flashes requesting operator. NFY key light flashes. |
| 12. | Open talk key, notify calling party, press NFY key, and close talk key. | NFY key light turns off. Another call can be serviced. |
| 13. |  | When called party goes on-hook and calling party signals at end of call, associated FS light turns on and RS light flashes. |
| 14. | Open talk key. | CHG DUE and KP DEP key lights flash. |
| 15. | Press MIN/RATE key and inform calling party of overtime deposit required. | Overtime minutes will be displayed on numerical display with rate stop if entered at step 9. |
| 16. | After deposit is made, enter amount of deposit using numeric keys. | KP DEP key light stays on. CHY DUE key light turns off. Pressing KP DEP key will display total deposit for call. When calling party goes on-hook, associated RS light stays on. |
| 17. | Pull rear and front cords. | See step 13 in Table 1. |

*Optional Step

TABLE 3

PPCS Special Calling Call

| Step | Operator Action | Comments |
|---|---|---|
|  |  | If tollboard is not already set to receive PPCS calls, PPCS ACC key light flashes to indicate that a PPCS call is waiting |
| 1. | Press PPCS ACC key to | PPCS key light stays on. Call is |

TABLE 3-continued

| | PPCS Special Calling Call | |
|---|---|---|
| Step | Operator Action | Comments |
| | accept PPCS call. | received on operator's headset with 3 beep-tones. KP CLD key light turns on, called number having been dialled For a system with ANI, CLG key light turns on. For ONI/PPCS calls, KP CLG key light flashes. |
| 2. | Request call class, and calling number on ONI/PPCS calls for which enter calling number using numeric keys. | KP CLG key lights, if previously flashing, stays on. |
| 3. | Press PERSON SPL CLG key. | PERSON SPL CLG key light turns on and call is outpulsed. KP SPL key light flashes. |
| 4. | Enter special number (third party or credit card number) supplied by calling party using numeric keys. | KP SPL key light stays on. KP TKID key light flashes. |
| 5. | From readout on PPCS tollboard, enter ticketer number using numeric keys. | KP TKID key light stays on. |
| 6. | Press ST TMG key. | See step 10 in Table 1. |
| 7. | Press POS RLS key. | POS RLS key light turns on, call is released from keyboard and displayed, and POS RLS key light turns off. Other lights associated with call turn off. PPCS ACC key light stays on and tollboard will still accept PPCS calls. |

Having described the apparatus in block diagrammatic form, and having described in detail the manner in which the apparatus operates, it will be clear to persons having ordinary skill in the art how the individual blocks of the apparatus may be implemented using known components, and how the apparatus is connected to the individual different types of known operator positions and AMA equipment.

The invention is not limited to the particular embodiment described, and many adaptations, modifications, and variations may be made without departing from the scope of the invention as defined in the claims. In particular in this respect it is observed that, whilst the provision of an individual unit 104 in respect of each operator position as described above is a particularly advantageous arrangement which is preferred, in other arrangements within the scope of the claims a plurality of operator positions would be coupled to each of the plurality of independently operable processing and storage units.

What is claimed is:

1. Apparatus for use in a telephone exchange having a plurality of operator positions one or more of which are operator cordboard positions, said apparatus comprising:

a plurality of information entry and display means each associated with a respective operator position, each information entry and display means comprising means for entering and displaying information relating to telephone connections which are established using the respective operator position;

a plurality of independently operable processing and storage means each coupled to an individual respective one of said information entry and display means;

means for coupling each processing and storage means to the operator position which is associated with the information entry and display means which is coupled to the respective processing and storage means;

each processing and storage means being arranged for monitoring the operator position to which it is coupled, checking information entered via the information entry and display means to which it is coupled, controlling the display of information by the information entry and display means to which it is coupled, timing connections established using the operator position to which it is coupled, and storing information relating to said connections; and means for coupling said processing and storage means to automatic message accounting equipment for transferring thereto stored information from each processing and storage means.

2. Apparatus as claimed in claim 1 wherein each information entry and display means comprises a keyboard and display unit having a plurality of keys for information entry, a plurality of lights at least some of which are associated with at least some of the keys, and a numeric display.

3. Apparatus as claimed in claim 1 wherein each processing and storage means and the means for coupling it to the respective operator position comprise a microprocessor and storage unit and interface circuits for connection to the respective operator position and information entry and display means.

4. Apparatus as claimed in claim 1 wherein the means for coupling the processing and storage means to automatic message accounting equipment comprises a processing and storage unit for temporarily storing and concentrating the information relating to said connections established using the operator positions and for transferring the concentrated information to the automatic message accounting equipment.

5. Apparatus as claimed in claim 4 wherein the means for coupling the processing and storage means to the automatic message accounting equipment comprises duplicated processing and storage units and error detection means for comparing signals in the duplicated units to detect errors.

6. Apparatus as claimed in claim 4 and including at least one teletypewriter coupled to the means for coupling the processing and storage units to the automatic message accounting equipment.

7. Apparatus as claimed in claim 4 and including a further storage unit coupled to the means for coupling the processing and storage units to the automatic message accounting equipment.

8. Apparatus as claimed in claim 1 wherein each processing and storage means includes means for forwarding the stored information relating to a connection, to the means for coupling the processing and storage means to automatic message accounting equipment, in response to termination of the connection, and in the event that the stored information can not be forwarded for providing an indication of this via the respective information entry and display means.

9. A telephone exchange comprising:

a plurality of operator positions one or more of which are operator cordboard positions;

a plurality of information entry and display means each associated with a respective one of the operator positions, each information entry and display means comprising means for entering and displaying information relating to telephone connections established using the associated operator position;

a plurality of independently operable processing and storage means each coupled to a respective operator position and to the associated information entry and display means for monitoring the operator position, checking information entered via the information entry and display means, controlling the display of information by the information entry and display means, timing said connections established using the operator position, and storing information relating to said connections; and means for coupling said processing and storage means to automatic message accounting equipment for transferring thereto stored information from each processing and storage means.

* * * * *